United States Patent [19]

Park

[11] 3,901,875
[45] Aug. 26, 1975

[54] EXTRACTION OF GINSENG SAPONIN
[75] Inventor: Woo Chang Park, Seoul, South Korea
[73] Assignee: Pacific Chemical Industrial Co., Ltd., Seoul, South Korea
[22] Filed: Mar. 26, 1973
[21] Appl. No.: 345,243

[30] Foreign Application Priority Data
Mar. 31, 1972 South Korea .................... 492/1972

[52] U.S. Cl. ............................. 260/210.5; 424/182
[51] Int. Cl.² ........................................ C07J 167/40
[58] Field of Search ................................. 260/210.5

[56] References Cited
UNITED STATES PATENTS
3,510,472  5/1970  Buckner.......................... 260/210.5

OTHER PUBLICATIONS
Heftmann, Erich, "Chromotography," second edition, pp. 52–53, (1967).

Primary Examiner—Johnnie R. Brown
Assistant Examiner—Cary B. Owens
Attorney, Agent, or Firm—Bierman & Bierman

[57] ABSTRACT

A process for the extraction of total ginseng saponin from crude ginseng leaves and flowers comprising contacting said crude ginseng with an alcohol, separating said alcohol from the extracted residue, contacting said extracted residue with a first solvent comprising benzene, chloroform or ether, separating said first solvent to leave a solvent residue, contacting said solvent residue with a second solvent comprising butanol or amyl alcohol to form a solution, passing said solution through an acidic alumina column, and separating said second solvent from said ginseng saponin. Preferably, the first solvent may contain butanol or ether acetate as a secondary solvent.

12 Claims, No Drawings

EXTRACTION OF GINSENG SAPONIN

This invention comprises a process for the extraction of total ginseng saponin contained in the ginseng plant from the leaves and flowers thereof. Although one or two kinds of saponin have previously been separated from ginseng root and purified in an experimental extraction method, there has been no teaching nor any suggestion of an extraction process which is capable of separating and purifying the total ginseng saponin from the leaves and flowers of the plant.

In a conventional extraction method, ginseng root was extracted with methanol. The methanol was distilled off leaving the extract which was treated with butanol, and then agitated with the addition of distilled water. The butanol phase was separated by silica gel chromatography, but only two kinds of saponin were obtained. This known process was merely experimental and it could separate and purify only one or two of the more than ten kinds of saponin. When this process is applied to the extraction of ginseng leaves and flowers, the purity of the total ginseng saponin obtained was only 17%. The reason for such a low purity is that substantial quantities of chlorophyll and other chromatophores contained in ginseng leaves and flowers are introduced into the extract, and are not removed in the extraction process.

It is among the objects of this invention to produce highly purified total ginseng saponin on a large scale by effectively removing the impurities by the extraction of saponin from ginseng leaves and flowers.

By the present process it is possible to produce highly purified total ginseng saponin on a large scale. This substance is useful in cosmetics, in pharmaceutical applications, and as a hemolytic. The process utilizes the ginseng leaves and flowers which have heretofore been regarded as worthless.

In practicing the present invention, crude ginseng leaves and flowers are extracted with an alcohol, preferably methanol. The alcohol is then separated from the extracted residue and this residue is further extracted with a first solvent which may be benzene, chloroform or ether. In the preferred form of the invention, benzene is used.

The first solvent is then separated leaving a solvent residue. This solvent residue is further extracted with a second solvent comprising butanol or amyl alcohol (preferably the former) whereby a solution is formed. The solution is then passed through an acidic alumina column whereby the desired ginseng saponin is separated. Usually the alcohol is mixed with water and the alcohol layer passed through the column.

In a preferred form of the invention, the first solvent includes 1 to 10% by weight of butanol or ethylacetate as a secondary solvent. Butanol is preferred as the secondary solvent.

Separation of the various extracting agents and/or solvents from the residues can be accomplished by any usual means, such as distillation. However, in the most preferred form of the invention, the second solvent is separated from the remainder by evaporation under subatmospheric pressure. In this invention, since the solution is preferably passed through an acidic alumina column at a flow rate of about 10 ml per minute, the impurities are easily removed, and highly purified total ginseng saponin is obtained within a short time.

Table 1 is a comparison of the prior art process described herein with the process of the present invention.

Table I

| | Raw Material | Pre-treatment | Column | Purity (based on sapogenin) |
|---|---|---|---|---|
| Known method | Ginseng leaves and flowers | — | Silica gel | about 17% |
| Process according to this invention | " | Benzene | Alumina | about 56% |
| " | " | Cosolvent of benzene and 1–10 weight % of butanol based on benzene | " | more than about 73% |

As shown in the Table above, it has been found that saponin obtained by the extraction process of the present invention has the similar high purity total ginseng saponin existing in ginseng root. As a result, total ginseng saponin of high purity from the ginseng leaves and flowers (heretofore considered worthless) extracted according to this invention can be used as an important source of this material.

EXAMPLE 1

5Kg of dried ginseng leaves and flowers are kept in 54 liters of methanol for three days at room temperature, or alternatively for more than three hours in hot methanol. The extract obtained was distilled to remove the methanol, and a solvent comprising 4 liters of benzene and 120 ml of butanol was added to the extracted as distillation and agitated for 30 minutes. Separating the above solution removed the dissolved chlorophyll and other chromatophores leaving a residue. To that residue 1.5 liters of butanol and 500 ml of distilled water were added and the mixture was agitated again. The butanol layer separated from the above solution and was passed through an acidic alumina column (2 × 20 cm) at a flow rate of 10 ml per minute, and the resulting effluent was evaporated under reduced pressure leaving the desired ginseng saponin. The purity, measured by gas chromatography (Beckman Model GC-5) was about 73% based on saponin.

While only one embodiment of the invention has been specifically described, it is nonetheless to be broadly construed and not to be limited except by the character of the claims appended hereto.

What is claimed is:

1. A process for the extraction of total ginseng saponin from crude ginseng leaves and flowers consisting essentially of contacting said crude ginseng with an alcohol, separating said alcohol from the extracted residue, contacting said extracted residue with a first solvent comprising benzene, chloroform or ether as a primary solvent, separating said first solvent to leave a solvent residue, contacting said solvent residue with a second solvent comprising butanol or amyl alcohol to form a solution, passing said solution through an acidic alumina column, and separating said second solvent from said ginseng saponin.

2. A process according to claim 1 wherein said first solvent contains 1 to 10% by weight of butanol or ethyl acetate as a secondary solvent.

3. A process according to claim 1 wherein said alcohol is methanol.

4. A process according to claim 1 wherein said primary solvent is benzene.

5. A process according to claim 1 wherein said primary solvent is ether.

6. A process according to claim 1 wherein said second solvent is amyl alcohol.

7. A process according to claim 1 wherein said second solvent is separated by evaporation under subatmospheric pressure.

8. A process according to claim 1 wherein said second solvent is butanol.

9. A process according to claim 1 wherein butanol is a secondary solvent.

10. A process according to claim 1 wherein ethyl acetate is a secondary solvent.

11. A process according to claim 1 wherein said second solvent is butanol.

12. A process according to claim 2 wherein said alcohol is methanol, said primary solvent is benzene, said secondary solvent is butanol, and said second solvent is butanol.

* * * * *